(12) United States Patent
Choi

(10) Patent No.: US 9,954,458 B2
(45) Date of Patent: Apr. 24, 2018

(54) CONTROL DEVICE IN HVDC SYSTEM AND OPERATING METHOD OF THEREOF

(71) Applicant: LSIS CO., LTD., Anyang-si, Gyeonggi-do (KR)

(72) Inventor: Yong Kil Choi, Anyang-si (KR)

(73) Assignee: LSIS CO., LTD., Anyang-si, Gyeonggi-Do (KR)

(*) Notice: Subject to any disclaimer, the term of this patent is extended or adjusted under 35 U.S.C. 154(b) by 94 days.

(21) Appl. No.: 15/092,498

(22) Filed: Apr. 6, 2016

(65) Prior Publication Data

US 2017/0214331 A1    Jul. 27, 2017

(30) Foreign Application Priority Data

Jan. 26, 2016 (KR) .................. 10-2016-0009649

(51) Int. Cl.
*H02J 3/36* (2006.01)
*H02M 5/45* (2006.01)
*H02M 1/42* (2007.01)

(52) U.S. Cl.
CPC .............. *H02M 5/45* (2013.01); *H02J 3/36* (2013.01); *H02M 1/42* (2013.01); *Y02E 60/60* (2013.01)

(58) Field of Classification Search
CPC ... H02J 3/36; H02M 1/42; H02M 5/45; Y02E 60/60
See application file for complete search history.

(56) References Cited

U.S. PATENT DOCUMENTS

| 2004/0158772 A1* | 8/2004 | Pan | H02J 3/00 |
| | | | 714/14 |
| 2013/0041520 A1* | 2/2013 | Chetty | H02J 3/36 |
| | | | 700/297 |
| 2015/0333644 A1* | 11/2015 | Choi | H02M 5/44 |
| | | | 363/35 |

FOREIGN PATENT DOCUMENTS

| CN | 103178512 | 6/2013 |
| CN | 104767217 | 7/2015 |
| EP | 2945248 | 11/2015 |
| JP | 2001100820 | 4/2001 |
| JP | 2001-508995 | 7/2001 |
| JP | 2002091527 | 3/2002 |
| JP | 2012105463 | 5/2012 |
| JP | 2012123469 | 6/2012 |

(Continued)

OTHER PUBLICATIONS

Japan Patent Office Application No. 2016-092497, Office Action dated Apr. 4, 2017, 2 pages.

(Continued)

*Primary Examiner* — Jue Zhang
*Assistant Examiner* — Jye-June Lee
(74) *Attorney, Agent, or Firm* — K&L Gates LLP

(57) ABSTRACT

A control device in a high voltage direct current (HVDC) system is provided. The control device includes a communication unit performing communication with a component in the HVDC system; and a control unit enabling the communication unit to receive, from the component, data on an available state of the component, calculating availability of the HVDC system defined as a ratio of an actual operation time of the HVDC system to an operable time of the HVDC system based on data on the available state of the component, and then performing control of the HVDC system based on the data on the available state of the component and the availability of the HVDC system.

17 Claims, 5 Drawing Sheets

(56) References Cited

FOREIGN PATENT DOCUMENTS

| | | |
|---|---|---|
| JP | 2015-015889 | 1/2015 |
| JP | 2015220983 | 12/2015 |
| KR | 10-2003-0037499 | 5/2003 |
| KR | 10-2005-0040394 | 5/2005 |
| KR | 10-0695222 | 3/2007 |
| KR | 10-1189803 | 10/2012 |
| KR | 10-1197576 | 11/2012 |
| KR | 10-2015-0040894 | 4/2015 |

OTHER PUBLICATIONS

European Patent Office Application Serial No. 16164155.0, Search Report dated Jun. 13, 2017, 9 pages.

Mebner, J. et al., "Digitale HGU-Leittechnik mit hoher Verfugbarkeit," Hochspannungstechnik, XP000322456, Dec. 1992, 6 pages.

* cited by examiner

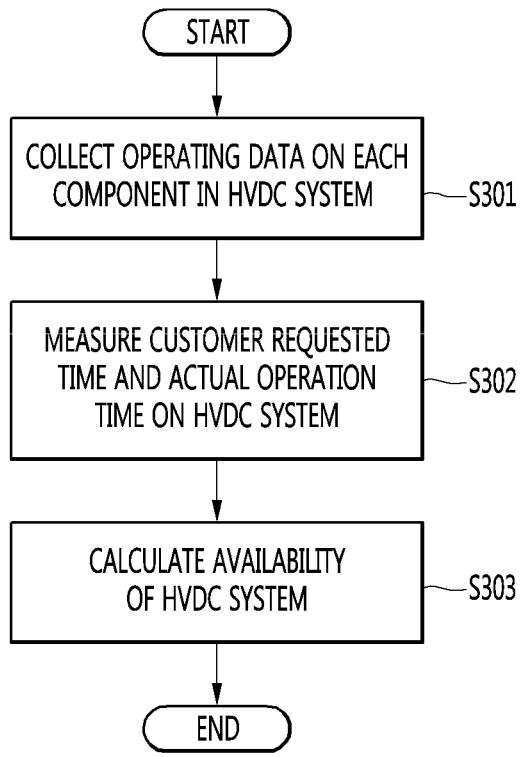

US 9,954,458 B2

CONTROL DEVICE IN HVDC SYSTEM AND OPERATING METHOD OF THEREOF

CROSS-REFERENCE TO RELATED APPLICATIONS

Pursuant to 35 U.S.C. § 119(a), this application claims the benefit of earlier filing date and right of priority to Korean Patent Application No. 10-2016-0009649, filed on Jan. 26, 2016, the contents of which are all hereby incorporated by reference herein in its entirety.

BACKGROUND

The present disclosure relates to a control device in a high voltage direct current (HVDC) system and an operating method thereof, and more particularly to, a control device in an HVDC system and an operating method thereof that monitor the availability of a component in an HVDC system to measure the availability of the HVDC system, evaluate and control the HVDC system based thereon.

A high voltage direct current (HVDC) system is a system that converts received alternating current (AC) power into direct current (DC) power to transmit the converted power in association with an AC power system and enables a reception side to convert the DC power back into the AC power to transmit the converted power.

FIG. 1 shows the configuration of a general HVDC system.

As shown in FIG. 1, an HVDC system 100 may include an AC yard, a DC yard, and a DC transmission yard.

The AC yard includes a reactive power compensator 122 that considers an associated AC power system 110, an AC harmonic filter 124 for decreasing a system harmonic wave that is generated from the AC power system 110, and a characteristic harmonic wave that is generated from the HVDC system 100, and a converter transformer 126 for transforming an AC voltage. In this case, a static synchronous compensator (STATCOM) or a shunt reactor instead of Static Var Compensator (SVC) in FIG. 1 may also be used as the reactive power compensator 122.

The DC yard includes a thyristor valve 132 for power conversion and a DC smoothing reactor 134 for the smoothing of a DC current component.

Converter stations may be connected by a DC transmission line 140 that uses a DC cable or a processed wire.

As such, since the HVDC system 100 is a system that converts a voltage and a current to supply power from a generation end to a reception end in association with a power network, the completeness or performance of the system should be necessarily evaluated if system construction is completed. The HVDC system 100 may be roughly evaluated based on loss and availability. However, it is now true that information on the states and available states of components in the HVDC system 100 is not collected. Also, there is no particular method of measuring the availability of the HVDC system 100.

SUMMARY

Embodiments provide a particular method of monitoring data on the availability of a component to measure the availability of an HVDC system, evaluate and control the HVDC system based thereon.

Embodiments also provide a method of collecting, by monitoring, information on a state in which a component may not operate, to apply it to a system design or the operation plan of a system to improve the system.

Technical issues to be achieved in embodiments are not limited to the technical issues as described above and other technical issues not mentioned would be clearly understood from the following descriptions by a person skilled in the art to which proposed embodiments pertain.

In one embodiment, a control device in a high voltage direct current (HVDC) system includes a communication unit performing communication with a component in the HVDC system; and a control unit enabling the communication unit to receive, from the component, data on an available state of the component, calculating availability of the HVDC system defined as a ratio of an actual operation time of the HVDC system to an operable time of the HVDC system based on data on the available state of the component, and then performing control of the HVDC system based on the data on the available state of the component and the availability of the HVDC system.

In another embodiment, an HVDC system includes at least one component related to an operation of the HVDC system; and a control device performing communication with the component to receive data on an available state of the component, calculate availability of the HVDC system that is defined as a ratio of an actual operation time of the HVDC system to an operable time of the HVDC system, based on the data on the available state of the component, then perform control of the HVDC system based on the data on the available state of the component and the availability of the HVDC system.

In further another embodiment, a method of operating a control device in an HVDC system includes performing communication with a component in the HVDC system to receive data on an available state of the component; calculate availability of the HVDC system that is defined as a ratio of an actual operation time of the HVDC system to an operable time of the HVDC system, based on the data on the available state of the component; and perform control of the HVDC system based on the data on the available state of the component and the availability of the HVDC system.

The details of one or more embodiments are set forth in the accompanying drawings and the description below. Other features will be apparent from the description and drawings, and from the claims.

BRIEF DESCRIPTION OF THE DRAWINGS

FIG. 2 shows the availability of an HVDC system measured by an embodiment.

FIG. 3 shows the process of calculating the availability of an HVDC system according to an embodiment.

DETAILED DESCRIPTION OF THE EMBODIMENTS

Figure 1:
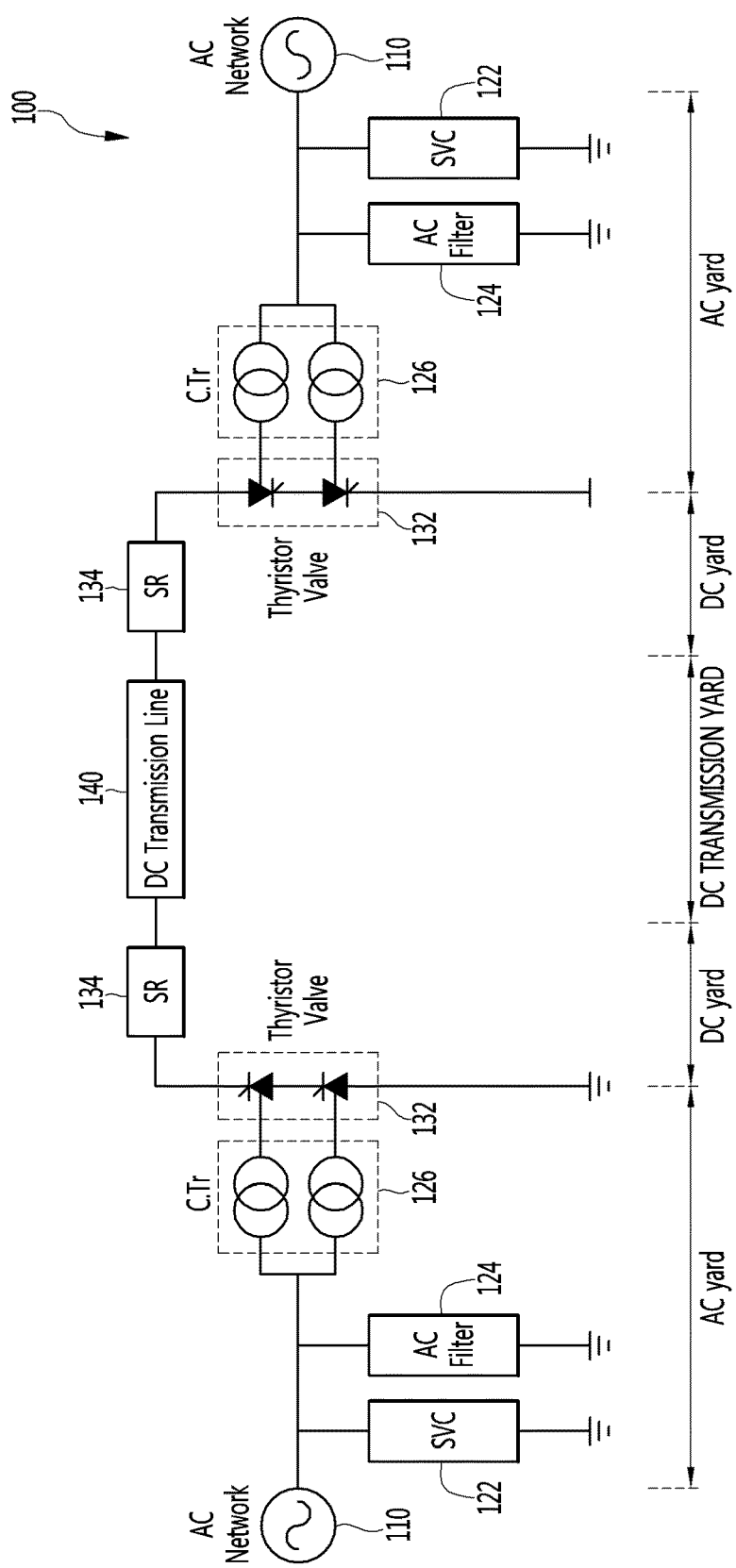
FIG. 1 shows the configuration of a general high voltage direct current (HVDC) system.

In the following, particular embodiments are described in detail with reference to the accompanying drawings. However, the technical spirit of the present disclosure is not limited by embodiments to be described below, and it is possible to easily propose regressive inventions or other embodiments that are included in the scope of the technical spirit of the present disclosure, by the addition, change and deletion of other components.

The terms used herein are general terms widely used in relation to the corresponding technology if possible but in special cases, the applicant has arbitrarily selected terms, in which case their meanings are described in detail when describing the corresponding invention. Therefore, it is noted that the present disclosure should be understood with the meaning of a term, not the name of the term. In the following description, the term 'including' does not exclude the presence of other components or steps that are different from those enumerated.

FIG. 2 shows the availability of a high voltage direct current (HVDC) system measured by an embodiment.

Even when a system is in an operating state, it does not mean that a user may always use the system. That is, the system may need a repair or experience a failure. Thus, availability is used in order to indicate how much a user may use a system. The availability may be a measure of measuring the reliability of a system.

The availability may be defined as the ratio of a time for which the system normally operates. That is, the availability is obtained by division of a value that is obtained by subtracting an unavailable time from the total available time, by the total available time. For the unavailable time, the system may not be used for some reasons.

The total available time refers to a time for which the system may operate. The total available time may be expressed by the sum of the available time and the unavailable time.

The available time is a time for which the system is turned on or a service is provided, and is defined as an uptime.

The unavailable time is a time for which the system is turned off or a service is not provided, and is defined as a downtime. That is, the unavailable time is a time for which the system itself may operate but for some unavailable reasons, the system is turned off or does not normally operate. The unavailable time may include a time for system maintenance, a time for handling a failure or defect, and a time for a system update.

In this case, the availability is expressed by the following equation:

$$\text{Availability} = \frac{\text{uptime}}{\text{uptime} + \text{downtime}} \times 100. \quad (1)$$

The table in FIG. 2 represents the availability of an HVDC system 100 and a corresponding annual stop time. The annual stop time represents how long the HVDC system 100 may not operate for one year (365 days) and corresponds to a downtime. If the availability of the HVDC system 100 is 99%, it is difficult to use the HVDC system for three days, 15 hours and 36 minutes of 365 days. Also, in the case where the availability of the system is 99.9999%, the system does not normally operate for 32 seconds of 365 days.

FIG. 3 shows the process of calculating the availability of an HVDC system according to an embodiment.

The HVDC system 100 according to the embodiment may be constructed according to a request from a consumer, such as a power supplier. In this case, the administrator of the HVDC system 100 has to operate the HVDC system 100 according to a consumer request time. In the case where the operation time of the HVDC system 100 does not satisfy the consumer request time, it corresponds to a system accident. Thus, the administrator of the HVDC system 100 monitors the operation state of the HVDC system 100. In particular, it is possible to measure the availability of the HVDC system 100, and analyze and evaluate the state of the HVDC system 100 based thereon to take an action for the improvement of the HVDC system 100.

In the following, the availability of the HVDC system 100 is defined in the embodiment. The operation of analyzing and evaluating the HVDC system 100 based on the calculated availability to take an action for the improvement of the HVDC system 100 is described below with reference to FIG. 6.

The availability of the HVDC system 100 may be defined as the ratio of a time for which the HVDC system 100 is normally operating. That is, the availability is obtained by division of the actual operation time by the total operable time.

The total operable time refers to a time for which the system may operate.

According to an embodiment, the total operable time may be set according to a request from a consumer. That is, the administrator of the HVDC system 100 sets the HVDC system so that the HVDC system 100 operates for a time requested by the consumer, when the HVDC system 100 is constructed, and the administrator operates the HVDC system 100 according to the setting. There is no need to operate the HVDC system 100 for a time exceeding the consumer request time. Thus, even if the HVDC system 100 may continuously operate for 361 days per year, the total operable time becomes 350 days if the consumer request time is 350 days. In this case, the total operable time becomes the consumer request time.

The actual operation time is a time for which the HVDC system 100 is normally operating. In this case, the actual operation time is a time that is obtained by excluding, from the total operable time, a time for which the system is turned off or does not operate for some inoperable reasons. The inoperable reasons may include a time for the maintenance of the HVDC system 100, a time for handing a failure or defect, a time for a system backup or update, or the like.

A planned stop time does not correspond to the inoperable reasons. The planned stop time is a time that has been scheduled to stop for system maintenance and a component check upon the construction of the HVDC system 100. Thus, it is distinguished from a time for system maintenance and a component check that unexpectedly occurs during the operation of the HVDC system 100. The administrator of the HVDC system 100 determines without consideration of the planned stop time when determining the consumer request time and the inoperable reasons, and thus the planned stop time is not considered in calculating the availability according to the present embodiment. In this case, the availability may be expressed by the following equation:

$$\text{Availability} = \frac{\text{actual} - \text{operation} - \text{time}}{\text{consumer} - \text{request} - \text{time}} \times 100. \quad (2)$$

The availability calculated by Equation 2 may be measured by a control device 400 in the HVDC system 100 according to an embodiment. The detailed configuration of the control device 400 is described below with reference to FIG. 4.

As shown in FIG. 3, the control device 400 collects operating data information for each component of the HVDC system 100 in step S301. The operating data information may be data on the available state of a component.

According to an embodiment, the control device 400 may assign a priority or weight to a component according to whether the component affects the operation of the HVDC system 100. Accordingly, it is possible to collect operating data information on a component in a descending order of priority or weight or it is possible to exclude a component having a low priority or weight from a target to collect operating data information.

The component may include various components in the HVDC system 100, such as a reactive power compensator, a gas insulated switchgear (GIS), an AC harmonic filter, a converter transformer, a thyristor valve, a DC smoothing reactor, a DC transmission line.

The control device 400 measures a consumer request time and an actual operation time on the HVDC system 100 in step S302.

The consumer request time is a time requested by a consumer so that the HVDC system 100 operates, and may be set upon the construction of the HVDC system 100.

The actual operation time is a time that is obtained by subtracting, from the consumer request time, a time for which the HVDC system 100 is turned off or does not normally operates for some inoperable reasons. The inoperable reasons may include a time for the maintenance of the HVDC system 100, a time for handing a failure or defect, a time for a system backup or update, or the like. When determining the consumer request time and the actual operation time for the calculation of the availability, the planned stop time is not considered. For example, when it is assumed that the consumer request time of the HVDC system 100 is 300 days and the planned stop time is 10 days, the administrator of the HVDC system 100 would design the system so that the HVDC system 100 operates for 300 days among remaining periods excluding the planned stop time, 10 days, upon the construction of the system. In this case, since the availability is defined as the ratio of a time for which the system may operates and a time for which the system is normally operating, the planned stop time does not correspond to the operable time. Thus, the planned stop time is not considered in calculating the availability.

The control device 400 calculates the availability of the HVDC system 100 based on the measured consumer request time and the actual operation time, in step S303. In particular, the control device 400 may calculate the availability as the ratio of the actual operation time to the consumer request time. While in FIG. 3, descriptions are provided on the assumption that the operable time of the HVDC system 100 is the consumer request time, the operable time may vary according to an embodiment. In this case, the availability of the HVDC system 100 may be defined as the ratio of the actual operation time to the operable time.

Figure 4:
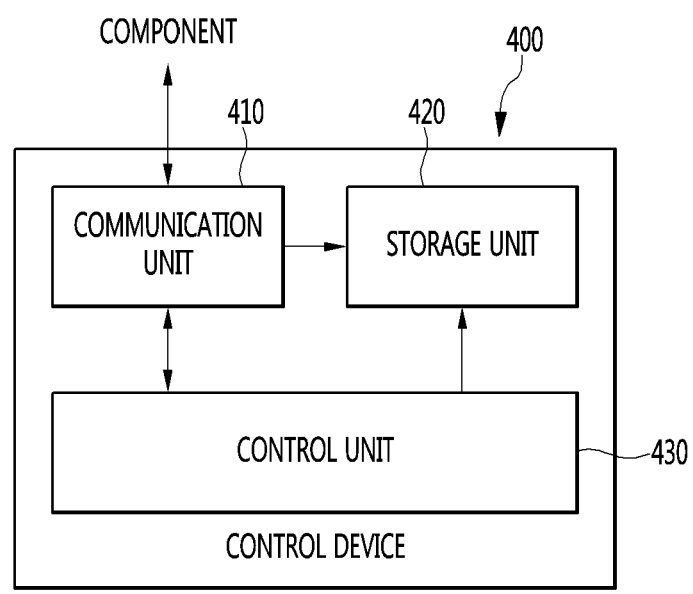
FIG. 4 is a block diagram of a control device according to an embodiment.

FIG. 4 is a block diagram of a control device according to an embodiment.

The control device 400 according to an embodiment may be included in the HVDC system 100 to perform the protection and general control of the HVDC system 100. The detailed configuration and operation of the HVDC system is described below with reference to FIG. 5. According to an embodiment, the control device 400 may be a control and protect (C&P) device in the HVDC system 100.

The control device 400 according to the embodiment may include a communication unit 410, a storage unit 420, and a control unit 430.

The communication unit 410 may perform communication with a component in the HVDC system 100 to receive data on the available state of the component. To this end, the communication unit 410 may be connected to the component through a line or cable to transmit and receive data. However, the communication method that the communication unit 410 and the component perform is not limited thereto, and it is possible to perform communication by all types of wired/wireless communication techniques by which it is possible to transmit and receive data, such as optical communication, power line communication, wireless LAN communication, mobile communication.

The number of the components of the HVDC system 100 may be at least one and be connected to the communication unit 410 of the control device 400 through wired, such as a cable or line, or other wireless techniques. In this case, the component may measure data on the available state of a corresponding component and transmit the measured data to the control device 400 by communication with the communication unit 410.

In particular, the component may include a current transformer (CT), a potential transformer (PT), a thyristor valve, a reactive power compensator, a GIS, an AC harmonic filter, a converter transformer, a DC smoothing reactor, a disconnected switch (DS), an earth switch (ES), a DC transmission line, or the like.

The storage unit 420 may store data on the available state of a component and data on the availability of the HVDC system. While in FIG. 4, the storage unit 420 is include in the control device 400, the storage unit 420 may not be included in the control device 400 according to an embodiment.

The data stored in the storage unit 420 may be classified and stored by component. Also, the data may be continuously updated to be stored in the form of accumulated data in the storage unit 420. In this case, a control unit 430 to be described below may evaluate and control the HVDC system 100 based on the accumulated data.

The control unit 430 may enable the communication unit 410 to receive data on the available state of a component from the component. In particular, the control unit 430 may use a connection wire, such as a cable or line, or wired/wireless communication to receive data on the available state from a CT, a PT, a DS, and an ES in a component, such as a thyristor valve, a transformer, a GIS.

Alternatively, the control unit 430 may collect information on the available state of each component from the power state of a component. That is, in the case where a component corresponds to a passive device, it is possible to trip the component or display separate state information on a human machine interface (HMI).

According to an embodiment, available states may be classified into an operable state, an inoperable state, an actual operation state, a failure or defect state, a maintenance state, a system backup or update state, or the like.

The operable state is a state in which a system may operate. The inoperable state is a state in which the system is in an operable state but does not normally operate for an inoperable reason. The actual operation state is a state in which the system normally operates. In the case of the maintenance state, it is possible to turn off a system power supply for system maintenance and in the case of the system backup or update state, the system may stop its operation for a predetermined time.

The control unit 430 may calculate the availability of the HVDC system that is defined as the ratio of the actual operation time of the HVDC system 100 to the operable time of the HVDC system 100, based on the available state of the component.

The actual operation time of the HVDC system 100 may be defined as a time excluding the inoperable time of the HVDC system 100 from the operable time of the HVDC system 100. In this case, the inoperable time of the HVDC system 100 may be defined as a time for which the HVDC system 100 does not normally operate for inoperable reasons though the HVDC system is in an operable state. According to an embodiment, the operable time of the HVDC system 100 may be a time requested by a customer upon on the construction of a system.

The inoperable reasons may include at least one of maintenance, a defect, a system backup or update.

The control unit 430 may store data on the available state of a component and data on the availability of the HVDC system 100, in the storage unit 420.

Then, the control unit 430 may perform evaluation and control on the HVDC system 100 based on the data on the available state of the component and the data on the availability of the HVDC system 100 that are stored in the storage unit 420.

According to an embodiment, in the case where the availability of the HVDC system 100 is lower than a desired value, the control unit 430 may check a component at a planned stop time for which the HVDC system 100 does not operate, The planned stop time is not included in the operable time and is thus not considered for the calculation of availability. Thus, by checking the component monitored for a planned stop period to prevent an accident due to a failure or defect, it is possible to increase availability.

According to another embodiment, in the case where the HVDC system 100 transmits power as a bipolar transmission signal and the availability of the HVDC system 100 is lower than a desired value, the control unit 430 may check a component connected to one side of the bipolar transmission signal at a time when the power moves to the other side of the bipolar transmission signal. The HVDC system 100 may perform mono-polar transmission or bipolar transmission. Thus, in the case of the bipolar transmission, it is possible to check a component connected to the opposite side. In this case, it is possible to prevent an accident or defect that a system may experience, thus the availability of the system may increase.

According to another embodiment, in the case where the availability of the HVDC system 100 is lower than a desired value, the control unit 430 may add, to the HVDC system 100, at least one of an AC harmonic filter, a DC smoothing reactor, a reactive power compensator, and a GIS without stopping the operation of the system 100.

Figure 5:
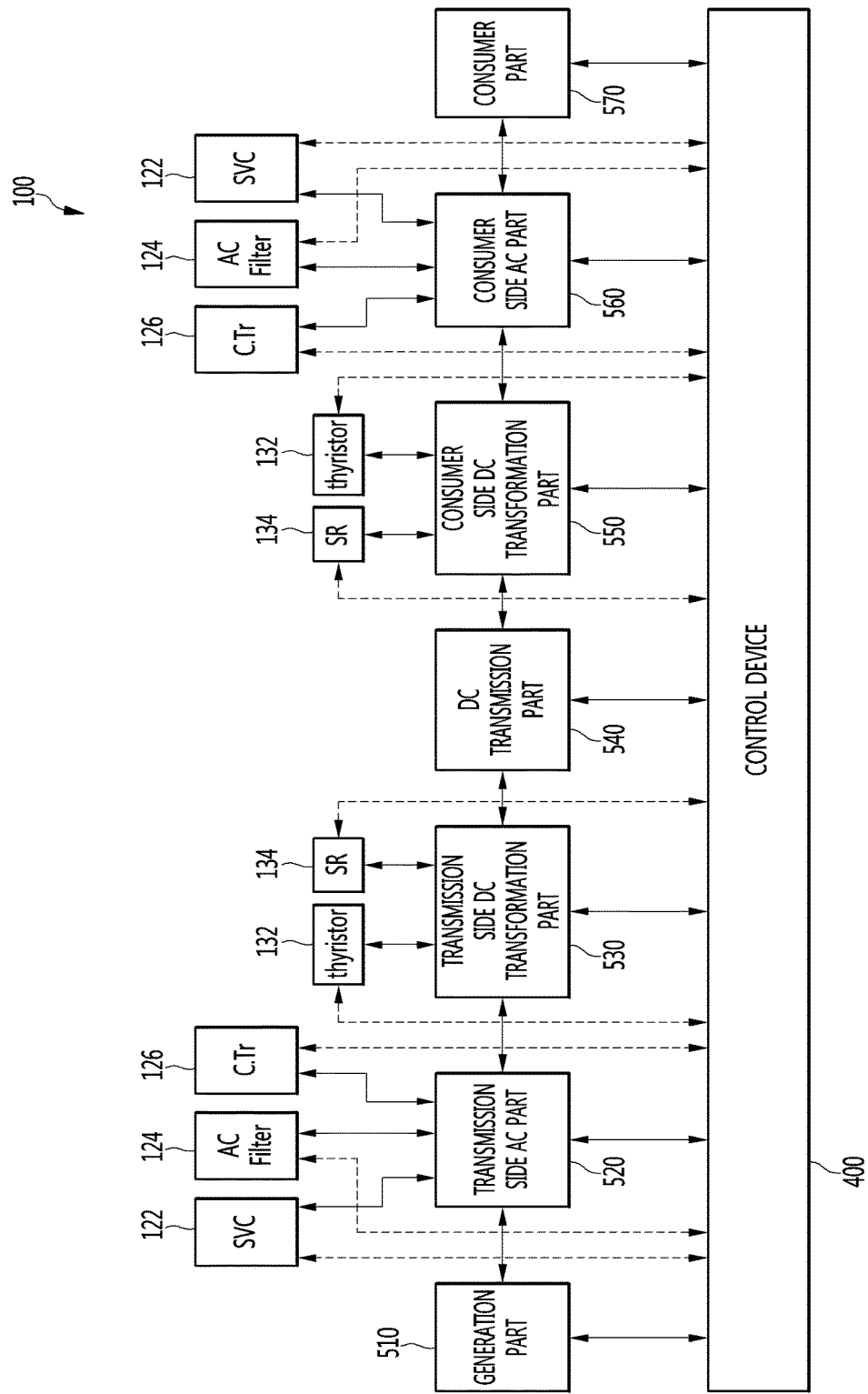
FIG. 5 shows the configuration of an HVDC system according to an embodiment.

FIG. 5 shows the configuration of an HVDC system according to an embodiment.

An HVDC system 100 according to an embodiment may include a generation part 510, a transmission side AC part 520, a transmission side DC transformation part 530, a DC transmission part 540, a consumer side DC transformation part 550, a consumer side AC part 560, a consumer part 570, a plurality of components 122, 124, 126, 132, and 134, and a control device 400.

The generation part 510 generates three-phase AC power. The generation part 510 may include a plurality of power stations.

The transmission side AC part 520 delivers three-phase AC power generated by the generation part 510 to the transmission side DC transformation part 530.

The transmission side DC transformation part 530 may include a transmission side transformer (not shown) and a transmission side AC-DC converter (not shown). In this case, the transmission side transformer (not shown) isolates the transmission side AC part 520 from the transmission side AC-DC converter (not shown) and the DC transmission part 540. The transmission side AC-DC converter (not shown) converts three-phase AC power corresponding to the output of the transmission side transformer (not shown) into DC power.

The DC transmission part 540 delivers the DC power from the transmission side to the consumer side.

The consumer side DC transformation part 550 may include a consumer side DC-AC converter (not shown) and a consumer side transformer (not shown). The consumer side DC-AC converter (not shown) converts the DC power delivered by the DC transmission part 540 into three-phase AC power. The consumer side transformer (not shown) isolates the consumer side AC part 560 from the consumer side DC-AC converter (not shown) and the DC transmission part 540.

The consumer side AC part 560 provides three-phase AC power corresponding to the output of the consumer side transformer (not shown) to the consumer part 570.

The plurality of components in the HVDC system 100 may include a reactive power compensator 122 that considers an associated AC power system, an AC harmonic filter 124 for decreasing a system harmonic wave that is generated from the AC power system, and a characteristic harmonic wave that is generated from the HVDC system 100, a converter transformer 126 for transforming an AC voltage, a thyristor 132 for power conversion, and a DC smoothing reactor 134 for the smoothing of a DC current component.

The plurality of components may be connected to the control device 400 by a cable or line and may transmit, to the control device 400, data on the available state of each of the components.

As described earlier in FIG. 4, the control device 400 collects data on the available state of a component in the HVDC system 100, calculates, from the collected data, availability that defines the ratio of the actual operation time of the HVDC system 100, and then performs control of the HVDC system 100 based on the data on the availability of the component and the availability of the HVDC system 100.

In addition, the control device 400 also performs the general control of the HVDC system 100. In particular, the control device 400 may control at least one of a generation part 510, a transmission side AC part 520, a transmission side DC transformation part 530, a DC transmission part 540, a consumer side DC transformation part 550, a consumer side AC part 560, a consumer part 570 and the control device 400.

To this end, the control device 400 may control the timing to turn on and off of a plurality of valve in the transmission side AC-DC converter (not shown) and the consumer side DC-AC converter (not shown). In this case, the value may correspond to a thyristor or insulated gate bipolar transistor (IGBT). Also, the control device 400 may further include a valve controller that controls the above-described valves.

Figure 6:
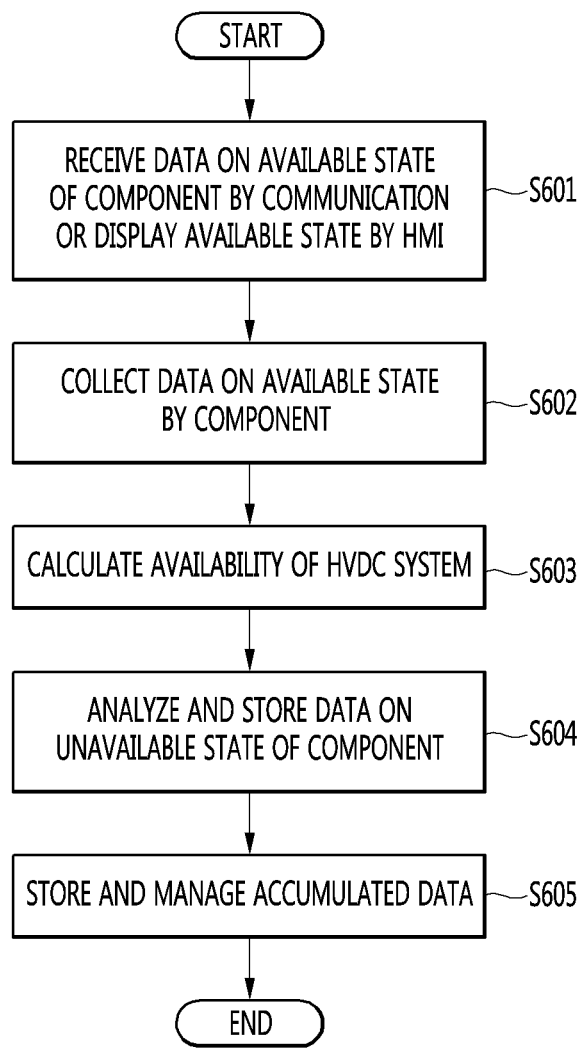
FIG. 6 shows the process of operating a control device in an HVDC system according to an embodiment.

FIG. 6 shows the process of operating a control device in an HVDC system according to an embodiment.

The control device 400 receives data on the available state of a component by communication or displays the available state by HMI, in step S601.

In particular, in the case where the component is an active device, i.e., in the case of a CT, a PT, a DS or an ES that is included in a component, such as a thyristor valve, a transformer, a GIS, it is possible to receive the data on the available state by using a connection wire, such as a cable or line, or wired/wireless communication. In the case where the component corresponds to a passive device, it is possible to trip each component or, if necessary, display separate state information on the HMI to collect available state information on each component from the power state of the component.

The control device 400 collects data on an available state by component in step S602.

Each component may or may not affect the operation of the HVDC system 100. In particular, the components may be roughly classified into a component that affects the operation of the HVDC system 100 in an inoperable state, and a component that does not affect the operation of the HVDC system 100 in an inoperable state. Further, in the former case, how much each component affects the operation of the HVDC system 100 may vary.

Thus, the control device 400 may collect state information on all components used for the HVDC system 100, i.e., operable and inoperable state information and times to aggregate availability for an actual reference time. According to an embodiment, the control device 400 may assign a priority or weight to a component according to whether to affect the operation of the HVDC system 100. Accordingly, it is possible to collect operating data information on a component in a descending order of priority or weight or exclude a component having a low priority or weight from a target to collect operating data information.

The control device 400 calculates the availability of the HVDC system in step S603.

In this case, the availability of the HVDC system 100 may be calculated by the ratio of the actual operation time of the HVDC system 100 to the operable time of the HVDC system 100.

The control device 400 analyzes and stores data on the unavailable state of a component in step S604.

According to an embodiment, the control device 400 may control a system to increase availability based on monitoring information on the available data and availability of the component. In the case where the availability of the HVDC system 100 is lower than a desired value, the following control may be possible.

In order to increase availability, a system administrator may repair a system without stopping the system. For example, in the case where the HVDC system 100 transmits power as a bipolar transmission signal, it is possible to check a component connected to one side of the bipolar transmission signal at a time when the power moves to the other side of the bipolar transmission signal. Alternatively, it is possible to check a component at a planned stop time for which the HVDC system 100 does not operate. Further, it is possible to add, to the HVDC system 100, at least one of an AC harmonic filter, a DC smoothing reactor, a reactive power compensator, and a GIS without stopping the operation of the HVDC system 100.

The control device 400 stores and manages accumulated data in step S605.

According to the present embodiment, it is possible to collect state information on all components used for the HVDC system 100, i.e., operable and inoperable state information and times to aggregate availability for an actual reference time, and analyze and evaluate the HVDC system 100. Also, it is possible to collect information on the inoperable state of a component to re-apply the information to a design or improve the system.

Embodiments proposed in the present disclosure may be applied to a transmission and transformation system, such as an SVC system, a converter station, a generation system, in addition to the HVDC system to be used for system analysis and evaluation based on availability calculation and data collection using availability information on a component. Also, the embodiments may also be utilized for maintenance, system analysis, economic efficiency analysis, system availability, and system life calculation.

According to embodiments, it is possible to collect state information on all components used for the HVDC system to determine operable and inoperable state information and times, aggregate availability for an actual reference time and evaluate the HVDC system.

Also, it is possible to collect information on a state in which a component may not operate, to re-apply the information to a design or improve the system based the information.

While embodiments have been mainly described above, they are only examples and do not limit the present disclosure and a person skilled in the art to which the present disclosure pertains could appreciate that it is possible to implement many variations and applications not illustrated above without departing from the essential characteristics of the embodiments. For example, components particularly represented in the embodiments may vary. In addition, the differences related to such variations and applications should be construed as being included in the scope of the present disclosure that the following claims define.

What is claimed is:

1. A control device for a high voltage direct current (HVDC) system, the control device comprising:
   a communication unit configured to perform communication with a component in the HVDC system; and
   a control unit configured to:
      control the communication unit to receive, from the component, data on an available state of the component, and
      calculate an availability of the HVDC system defined as a ratio of an actual operation time of the HVDC system to an operable time of the HVDC system based on data on the available state of the component,
   wherein the actual operation time of the HVDC system is defined as a time excluding an inoperable time of the HVDC system from the operable time of the HVDC system,
   wherein the inoperable time of the HVDC system is defined as a time for which the HVDC system does not normally operate for inoperable reasons though the HVDC system is in an operable state, and
   a planned stop time is not included in the inoperable time of the HVDC system, wherein the planned stop time is a time that has been scheduled to stop for system maintenance and a component check upon a construction of the HVDC system.

2. The control device according to claim 1, wherein the control unit performs control of the HVDC system based on the data on the available state of the component and the availability of the HVDC system.

3. The control device according to claim 1, wherein the inoperable reasons comprise at least one of maintenance, a defect, or a system backup or update.

4. The control device according to claim 1, wherein the operable time of the HVDC system is a time requested by a customer upon construction of a system.

5. The control device according to claim 1, further comprising a storage unit, wherein the control unit stores the data on the available state of the component and the availability of the HVDC system in the storage unit.

6. The control device according to claim 1, wherein the control unit checks the component at the planned stop time for which the HVDC system does not operate, in a case where the availability of the HVDC system is lower than a desired value.

7. The control device according to claim 1, wherein in a case where the HVDC system transmits power as a bipolar transmission signal, the control unit checks a component connected to one side of the bipolar transmission signal at a time when the power moves to another side of the bipolar transmission signal in a case where the availability of the HVDC system is lower than a desired value.

8. The control device according to claim 1, wherein the control unit adds, to the HVDC system, at least one of an alternating current (AC) harmonic filter, a DC smoothing reactor, a reactive power compensator, and a gas insulated switchgear (GIS) without stopping an operation of the HVDC system, in a case where the availability of the HVDC system is lower than a desired value.

9. The control device according to claim 1, wherein the component comprises at least one of a current transformer, a potential transformer, a thyristor valve, a reactive power compensator, a GIS, an AC harmonic filter, a converter transformer, a DC smoothing reactor, a disconnected switch, an earth switch (ES), and a DC transmission line.

10. The control device according to claim 1, wherein the control unit assigns a priority or weight to the component based on at least one of whether or how much the component affects an operation of the HVDC system.

11. An HVDC system comprising:
at least one component related to an operation of the HVDC system; and
a control device configured to:
perform communication with the component to receive data on an available state of the component,
calculate availability of the HVDC system that is defined as a ratio of an actual operation time of the HVDC system to an operable time of the HVDC system, based on the data on the available state of the component, and
perform control of the HVDC system based on the data on the available state of the component and the availability of the HVDC system,
wherein the actual operation time of the HVDC system is defined as a time excluding an inoperable time of the HVDC system from the operable time of the HVDC system,
wherein the inoperable time of the HVDC system is defined as a time for which the HVDC system does not normally operate for inoperable reasons though the HVDC system is in an operable state, and
a planned stop time is not included in the inoperable time of the HVDC system, wherein the planned stop time is a time that has been scheduled to stop for system maintenance and a component check upon a construction of the HVDC system.

12. A method of operating a control device for an HVDC system, the method comprising:
performing communication with a component in the HVDC system to receive data on an available state of the component;
calculating availability of the HVDC system that is defined as a ratio of an actual operation time of the HVDC system to an operable time of the HVDC system, based on the data on the available state of the component; and
performing control of the HVDC system based on the data on the available state of the component and the availability of the HVDC system,
wherein the actual operation time of the HVDC system is defined as a time excluding an inoperable time of the HVDC system from the operable time of the HVDC system,
wherein the inoperable time of the HVDC system is defined as a time for which the HVDC system does not normally operate for inoperable reasons though the HVDC system is in an operable state, and
a planned stop time is not included in the inoperable time of the HVDC system, wherein the planned stop time is a time that has been scheduled to stop for system maintenance and a component check upon a construction of the HVDC system.

13. The method according to claim 12, wherein the operable time of the HVDC system is a time requested by a customer upon construction of a system.

14. The method according to claim 12, wherein the data on the available state of the component and the availability of the HVDC system are stored.

15. The method according to claim 12, wherein the component is checked at the planned stop time for which the HVDC system does not operate, in a case where the availability of the HVDC system is lower than a desired value.

16. The method according to claim 12, wherein in a case where the HVDC system transmits power as a bipolar transmission signal, a component connected to one side of the bipolar transmission signal is checked at a time when the power moves to another side of the bipolar transmission signal in a case where the availability of the HVDC system is lower than a desired value.

17. The method according to claim 12, wherein at least one of an AC harmonic filter, a DC smoothing reactor, a reactive power compensator, and a GIS is added to the HVDC system without stopping an operation of the HVDC system, in a case where the availability of the HVDC system is lower than a desired value.

* * * * *